United States Patent
Rossi et al.

(10) Patent No.: US 12,122,681 B2
(45) Date of Patent: Oct. 22, 2024

(54) PROCESS FOR THE SYNTHESIS OF AMMONIA

(71) Applicant: CASALE SA, Lugano (CH)

(72) Inventors: Umberto Rossi, Como (IT); Alessandra Pennati, Lugano (CH); Raffaele Ostuni, Lugano (CH); Costantino Bruni, Lugano (CH)

(73) Assignee: CASALE SA, Lugano (CH)

( * ) Notice: Subject to any disclaimer, the term of this patent is extended or adjusted under 35 U.S.C. 154(b) by 735 days.

(21) Appl. No.: 17/266,207

(22) PCT Filed: Jul. 16, 2019

(86) PCT No.: PCT/EP2019/069145
§ 371 (c)(1),
(2) Date: Feb. 5, 2021

(87) PCT Pub. No.: WO2020/052832
PCT Pub. Date: Mar. 19, 2020

(65) Prior Publication Data
US 2021/0261425 A1    Aug. 26, 2021

(30) Foreign Application Priority Data

Sep. 11, 2018 (EP) .................................. 18193675

(51) Int. Cl.
*C01C 1/04* (2006.01)
*C01B 3/02* (2006.01)

(52) U.S. Cl.
CPC ............ *C01C 1/0494* (2013.01); *C01B 3/025* (2013.01); *C01B 2203/0233* (2013.01); *C01B 2203/068* (2013.01)

(58) Field of Classification Search
CPC ..... C01C 1/0494; C01C 1/0405; C01B 3/025; C01B 2203/0233; C01B 2203/068; C01B 3/50; C01B 2203/0244; C01B 2203/0283; C01B 2203/0475; C01B 2203/0844; C01B 2203/141; C01B 2203/142; C01B 2203/1604; C01B 3/382; F01K 17/06
See application file for complete search history.

(56) References Cited

U.S. PATENT DOCUMENTS

| | | | |
|---|---|---|---|
| 4,728,506 A | 3/1988 | Habermehl et al. | |
| 2004/0245086 A1 | 12/2004 | Steynberg et al. | |
| 2010/0303703 A1 | 12/2010 | Filippi et al. | |
| 2013/0108534 A1* | 5/2013 | Ostuni | C01C 1/0405 423/235 |
| 2014/0291993 A1 | 10/2014 | Matsuo et al. | |
| 2016/0145113 A1 | 5/2016 | Andersen et al. | |
| 2018/0044192 A1* | 2/2018 | Filippi | B01J 8/06 |

FOREIGN PATENT DOCUMENTS

| | | |
|---|---|---|
| CA | 152727 A | 12/1913 |
| CN | 103998723 A | 8/2014 |
| GB | 2146632 A | 4/1985 |
| WO | 0248027 A1 | 6/2002 |

OTHER PUBLICATIONS

International Preliminary Report on Patentability for International Application No. PCT/EP2019/069145 mailed Oct. 27, 2020.
International Search Report from International Application No. PCT/EP2019/069145 mailed Sep. 23, 2019.

* cited by examiner

*Primary Examiner* — Daniel Berns
*Assistant Examiner* — Syed T Iqbal
(74) *Attorney, Agent, or Firm* — Dorsey & Whitney LLP

(57) ABSTRACT

A process for the synthesis of ammonia from a hydrocarbon feedstock, wherein the process includes reforming the hydrocarbon feedstock to produce a make-up gas and converting said make-up gas into ammonia, the process is performed in an ammonia synthesis plant requiring an electric power for operation and also requiring a start-up power (Ps) for start-up, wherein a first electric power (P1) is internally produced in the ammonia plant, and a second electric power (P2) is imported, wherein said second electric power is equal to or greater than said start-up power (Ps).

10 Claims, No Drawings

PROCESS FOR THE SYNTHESIS OF AMMONIA

FIELD OF THE INVENTION

The present invention relates to the field of the industrial production of ammonia.

Prior Art

The industrial production of ammonia involves the catalytic reaction of a synthesis gas ("make-up gas") comprising hydrogen and nitrogen inside a high-pressure (HP) synthesis loop usually operating at about 80-300 bar.

The make-up gas is produced in a front-end section, upstream the HP synthesis loop, by conversion of a hydrocarbon feedstock (e.g. natural gas).

The conversion of natural gas into said make-up gas usually involves a primary reforming with steam and a secondary reforming with air, obtaining a raw synthesis gas, followed by purification of said raw gas. The purification usually includes shift conversion of carbon monoxide into carbon dioxide, removal of carbon dioxide and, optionally, methanation.

A plant for the production of ammonia also comprises a complex steam system including steam producers and steam users. The steam producers recover process heat from various process streams, mostly from the conversion of natural gas into raw synthesis gas (usually by steam reforming) and from the subsequent purification (usually from shift conversion). The main steam users are the driving turbines of large gas compressors, such as the synthesis gas compressor which raises the pressure of the make-up gas to the pressure of the synthesis loop and the air compressor which raises the air pressure from atmospheric to the pressure of the secondary reforming.

In addition to the above-mentioned large gas compressors, an ammonia plant typically contains several smaller auxiliary machines, such as small compressors, fans and pumps. Historically these smaller machines have been driven by small steam turbines having a low efficiency. For example, these turbines have a mechanical efficiency of 30-50%, resulting in a relatively high steam consumption.

In a few existing ammonia plants, some of the small steam turbines have been replaced with electric motors to reduce operating costs, while in some new plant designs most or all of the smaller machines are electrically driven. In the latter configuration, the necessary power is usually provided by a central generator driven by a larger and more efficient steam turbine, thus reducing plant energy consumptions by saving natural gas. Such turbine may have a mechanical efficiency of 80% or more. Furthermore, the larger the size of the steam turbine the higher the efficiency. Usually, said steam turbine expands more steam than that required by the generator to produce electric power, as it may conveniently drive one of the plant main compressor, and usually the biggest one.

The steam for the steam generator is produced in the plant using fuel energy. The above-mentioned configuration with central turbo-generator entails a significant fuel saving compared to a plurality of smaller turbines, due to the large difference in efficiency, even accounting for power losses entailed by electricity generation, distribution and use in the electric motors. Moreover, since electricity is produced in the plant starting from fuel, its cost is lower than the purchase cost from the external grid. Hence there is a clear trend to maximize the size of the steam turbo-generator to gain maximum benefits from electrification and higher machine efficiency. Accordingly, the prior art teaches to generate as much steam as possible from heat recovery from process gas cooling, up to the point that all electrical energy consumptions of the plant can be satisfied internally.

In plant front end, steam generation takes conveniently place in waste heat boilers by cooling the process gas. The latter is primarily a mixture of hydrogen and nitrogen, but contains also a considerable amount of carbon monoxide. Carbon monoxide, in conjunction to high temperature, can potentially lead to metal dusting, especially in heat exchangers. Waste heat boilers, contrary to gas-gas exchangers like steam superheaters, avoid working in the metal dusting risk zone. In fact, as they exchange almost exclusively latent heat, boiling water keeps the temperature of the metal parts low enough to avoid metal dusting.

During the start-up of an ammonia plant, the generator cannot produce any electric energy. To connect to the plant grid, in fact, the generator speed must match the grid frequency. The start-up is typically unsteady and during unsteady state operation the generator speed is not stable and the connection to the grid is not possible.

The plant startup, on the other hand, requires a certain input of electric power, which is termed startup power. The startup power is the power required to perform a predetermined start-up procedure.

As no power can be internally produced with the generator during the startup procedure, the startup power needs be imported from an external source, for example an electric grid. Said import is discontinued during the normal operation of the plant, when the turbo-generator can be operated.

The startup power may include the power required for (but not limited to): the primary reformer fan (or fans), the steam net pumps (boiler feed water, process and turbines condensates), the acid gas removal unit pumps, the auxiliary steam generator, the plant utilities (e.g. cooling water circuit).

The startup power is significant: it may have the same order of magnitude as the power required during operation of the plant. In a large ammonia plant the startup power is therefore of several megawatts. For example, an ammonia plant producing 3000 t/d of ammonia typically requires around 40 MW of electric power for operation and around 15 MW for startup.

The prior-art solution of producing internally as much energy as possible, importing the startup power from an external grid when needed, is made in an attempt to make efficient use of steam in the turbo-generator and to reduce the overall fuel consumption; however, it has important drawbacks.

The need of the startup power is temporary and unpredictable. For example a startup may be needed after an unplanned shut down of the plant. The import of such a large power for limited and unpredictable periods, if available, is very expensive.

Dedicated gas engines driving electricity generators have been installed in plants of the prior art to power the start-up phase instead of importing electric energy from the electric grid. This solution however is not satisfactory. It avoids costs associated with large electric power import at start-up but introduces another cost related to installation of large dedicated gas engines and generators, which are used only for start-up.

Hence, there is still the need to find a solution for the provision of electric energy during the start-up of an ammonia plant, which is easy to realize and low-cost while still enabling to have a high efficiency for the plant.

SUMMARY OF THE INVENTION

The aim of the invention is to overcome the aforementioned drawbacks and limitations of the prior art.

This aim is reached with a process for the synthesis of ammonia from a hydrocarbon feedstock, wherein the process includes reforming the hydrocarbon feedstock to produce a make-up gas and converting said make-up gas into ammonia, the process is performed in an ammonia synthesis plant requiring a predetermined electric power for operation and requiring a start-up power for start-up, and the process is characterized in that a first amount of electric power is internally produced in the ammonia plant, and in that a second amount of electric power is imported from a source of electric power which is external to said plant, wherein said second electric power is equal to or greater than said start-up power.

The start-up power is the power required during the start-up procedure of the process and related plant. The start-up procedure identifies a transitional condition wherein the plant passes from a shut-down condition to a steady-state operation. Also, the start-up procedure can be identified by the fact that the product (in this case ammonia) is not produced or is produced outside the required specification (e.g. in terms of purity).

The steady-state operation is identified as a condition where relevant operating parameters of the process remain constant or substantially constant, i.e. they vary within a limited range. Said operating parameters may include for example the temperature and pressure of the relevant steps of the process. Also, the steady-state operation can be identified as a condition where the product is produced within the required specification. In the steady-state operation, the process may deliver ammonia according to a nominal capacity (full load) or in a different amount when running at a partial load.

The start-up power may include the power supply to a primary reformer fan (or fans), to steam net pumps (boiler feed water, process and turbines condensates), to the acid gas removal unit pumps, to the auxiliary steam generator and to other utilities (e.g. cooling water circuit).

Preferably said first electric power is internally produced by means of a generator operated by a steam turbine, the generator and the turbine being part of said ammonia plant.

Preferably the import of said second electric power, which is equal to or greater than the start-up power, takes place for at least 80% of the operation time of said ammonia plant on an annual basis, preferably for at least 90% thereof.

The internally produced electric power is also denoted with the symbol P1. The power imported from said external source is also denoted with the symbol P2. The start-up power is also denoted with the symbol Ps. According to the present invention, said imported power P2 is equal to or greater than the start-up power Ps.

Preferably, said external source is an external electric network.

The invention provides that a relatively large amount of electric power is imported from an external source. The internally produced electric power P1 is therefore less than the prior art.

The prior art prompts to the electric power input required for operation being entirely or substantially entirely produced internally in the ammonia process, typically in a steam turbine and generator equipment. Compared to the prior art, the invention provides that less steam is expanded in the steam turbine coupled to said generator.

Accordingly, the invention has the following advantages: the generator and the steam turbine coupled to said generator are smaller; the start-up procedure is simplified compared to the prior art because the imported power P2 satisfies the requirement of the startup procedure; dedicated gas engines are not required to generate the start-up power; it is possible to make a contract for importing a fixed amount of electric power P2 from an external source.

The process of the invention may comprise a step of primary reforming of the hydrocarbon feedstock in the presence of steam and a step of secondary reforming of the so obtained first reformed gas. The step of primary reforming is performed in a fired steam reformer. The step of secondary reforming includes a step of air-fired secondary reforming of at least a portion of said first reformed gas; in some embodiments, part of the reforming is performed as gas heated reforming (GHR), arranged either in series or in parallel to the step of secondary reforming.

The process of the invention can also include the purification of a raw product gas, obtaining a make-up synthesis gas; conversion of said make-up synthesis gas into ammonia in a synthesis loop. Said primary reforming is preferably performed at a temperature of at least 790° C. and absolute pressure of at least 50 bar; said step of secondary reforming is carried out substantially in absence of excess air relative to the stoichiometric amount, and said make-up synthesis gas has a $H_2$ to $N_2$ molar ratio in the range 2.5 to 3.

Said primary reforming is advantageously carried out in a bundle of externally heated tubes filled with a catalyst (catalytic tubes) and said values of temperature and pressure are referred to the process gas at the exit of the catalytic tubes of the primary reforming.

The above mentioned temperature of at least 790° C. is preferably greater than 800° C., more preferably greater than 810° C.

Preferably, said $H_2$ to $N_2$ molar ratio is in the range 2.6 to 2.8.

The stoichiometric amount of air is understood as the amount which is necessary to achieve the $H_2$ to $N_2$ molar ratio of 3 in the make-up gas admitted to the synthesis loop, i.e. it depends substantially on the amount of hydrogen $H_2$ of said make-up gas. The substantially absence of excess air shall be understood as an amount of air which results in the $H_2$ to $N_2$ molar ratio being 2.5 or greater.

According to a preferred embodiment, the reforming process, including the primary reforming and secondary reforming, is operated with a global steam-to-carbon ratio equal to or greater than 2.9, preferably greater than 3. The global steam-to-carbon ratio denotes the overall ratio of steam and carbon admitted to the reforming process. Such relatively high steam-to-carbon ratio is beneficial to the conversion of the feedstock. It is also synergistic with the elevated pressure of the primary reforming, namely at least 50 bar absolute.

According to a preferred embodiment, the purification of said raw product gas comprises a step of high temperature shift (HTS) in at least one shift converter. Steam used to feed the steam turbines of the plant and steam used in the primary reforming (also called process steam) is recovered by thermal recovery from various process streams, mostly from the primary reforming and from the HTS.

Since part of the power input of the plant is imported from an external source and less steam is expanded in the steam turbine driving the electric generator, some of the steam generated via thermal recovery is advantageously superheated. The heat source for said steam superheating is the process gas before or after the HTS, i.e. feeding or leaving the HTS converter. This embodiment reduces the steam production in the front-end section and, therefore, the steam in excess, which otherwise would be too much due to the high pressure and the relatively high steam-to-carbon ratio of the reforming process. Accordingly, steam superheating is maximized, thus minimizing steam production in the plant.

In another embodiment, the heat contained in the process gas leaving the secondary reformer is conveniently used to reform part of the mixed feed in a gas heated reformer. In this way, steam production in the plant is reduced accordingly.

The gas heated reforming is preferably arranged in parallel with the secondary reforming, i.e. the gas reformed in the gas heated reforming mixes with that reformed in the secondary reforming. Alternatively, the gas heated reforming may be arranged in series with the secondary reforming, i.e. the gas reformed in the gas heated reforming is fed to the secondary reforming.

Advantages of embodiments featuring a GHR include: the duty of the fired primary reformer is reduced, which is an advantage to reach high capacity in terms of production of ammonia; the production of steam is reduced, which is an advantage particularly for standalone plants.

The process gas used for steam superheating has a temperature preferably higher than 400° C., more preferably higher than 450° C., and even more preferably higher than 500° C.

Preferably, the conversion of the make-up synthesis gas into ammonia is carried out at a loop pressure which is 2 to 3.5 times the pressure of the process gas at the exit of the primary reforming catalytic tubes. Said loop pressure is understood as the delivery pressure of a circulator of the loop. More preferably said loop pressure is in the range 100 to 200 bar, and even more preferably 120 to 160 bar.

Accordingly, the make-up synthesis gas is compressed to the loop pressure in a suitable gas compressor. Preferably, the delivery of the main gas compressor is sent to the suction side of the circulator of the loop. This results in the duty of the gas compressor being reduced since part of the compression is given by the circulator. The power absorbed by the compressor, for a given capacity, is reduced accordingly.

Preferably, said gas compressor is driven by a condensing steam turbine with no steam extraction and said turbine is fed with medium pressure steam. Said turbine is much simpler and cheaper. The terms "medium pressure" refers to a pressure which is few bars higher than the pressure of the reforming process.

Preferably, said gas compressor is a single casing machine with one compression section. This is possible due to the relatively high pressure of the reforming process. Said gas compressor can run at lower speed (revolutions per minute), is more efficient and has a simplified design. This allows a significant reduction of the footprint and the cost of the plant.

An air feed directed to the secondary reforming is advantageously compressed in an air compressor powered by a steam turbine. In some embodiments of the invention, the air compressor (instead of the syngas compressor) becomes the largest power user. Accordingly, the highest pressure available steam is used to drive the steam turbine coupled to said air compressor; steam discharged by, or extracted from, said turbine is preferably used for the primary reforming.

This is advantageous as regards the efficiency of the process, because air compression can be achieved much more efficiently than syngas compression. This is mainly due to the possibility to use, in some embodiments, an air compressor of the integrally geared type (IG), which is unsuitable for the synthesis gas.

Moreover, the steam turbine can be easily coupled to the air compressor with a dedicated pinion shaft at the desired speed: hence there is no limitation to the size of the steam turbine coupled to the air compressor.

As mentioned, the air compressor is preferably an integrally geared turbomachine (IG). An integrally geared turbomachine is typically designed to operate at fixed speed and is usually controlled acting on the inlet guide vanes (IGV) installed at suction. The efficiency of said compressor is affected by fluctuations of the volumetric flowrate of the air feed, which are due to temperature fluctuations of the air feed between day and night, summer and winter.

In order to work close to the point of maximum efficiency and to remain inside the range of control given by the IGV, the air feed could be heated or cooled at the suction of the air compressor, thus maintaining the inlet temperature of the air compressor within a target range.

Preferably the heater and/or the cooler are integrated with an air filter at the suction of the air compressor so as to reduce the footprint and save costs.

This embodiment provides an efficient way to properly control the air compressor and to keep the compressor operating within its optimal range, i.e. assuring the most efficient performance. This is particularly advantageous because even small variations of the air compressor efficiency have a significant impact on the energy consumption of the entire plant.

According to a preferred embodiment, the conversion of the make-up synthesis gas into ammonia is carried out in two reactors arranged in series so that the effluent of a first reactor is further reacted in a second reactor.

Preferably, the effluent of the first reactor is cooled before admission to the second reactor in a suitable heat exchanger placed between the two reactors. This is advantageous because allows to generate steam in said heat exchanger by cooling the product gas from the first reactor.

This solution is also advantageous because the cold product gas can be conveniently used to flush the pressure vessel of the second converter. The gas temperature is cold enough to avoid the nitriding attack zone, assuring safe operation of the second reactor.

Another aspect of the invention is a plant for the synthesis of ammonia according to the annexed claims.

Another aspect of the invention is a method of operating an ammonia plant wherein the ammonia plant requires a predetermined power for operation and requires a predetermined start-up power for start-up, the method being characterized in that a first amount of electric power is internally produced in the ammonia plant by means of a generator of the plant operated by a steam turbine, and in that a second amount of electric power, is imported from a source of electric power which is external to said plant, wherein said second electric power is equal to or greater than said start-up power.

The invention claimed is:

1. A process for synthesis of ammonia from a hydrocarbon feedstock, the process comprising:
reforming the hydrocarbon feedstock to produce a make-up gas;
converting said make-up gas into ammonia;
wherein the process is performed in an ammonia synthesis plant requiring a predetermined electric power for operation and requiring a start-up power for start-up;

internally producing a first amount of electric power in the ammonia synthesis plant; and importing a second amount of electric power from a source of electric power that is external to said ammonia synthesis plant, wherein said second electric power is equal to or greater than said start-up power.

2. The process according to claim 1, wherein said first electric power is internally produced by a generator operated by a steam turbine, the generator being part of said ammonia synthesis plant.

3. The process according to claim 1, wherein the importing of said second electric power, which is equal to or greater than the start-up power, takes place for at least 80% of the operation time of said ammonia plant on an annual basis.

4. The process according to claim 1, wherein reforming the hydrocarbon feedstock for the production of said make-up gas includes primary reforming of at least part of said hydrocarbon feedstock with steam obtaining a first partially reformed gas, and air-fired secondary reforming of said first partially reformed gas, thus obtaining a raw product gas, and a purification process of said raw product gas.

5. The process according to claim 4, wherein said primary reforming is performed at a temperature of at least 790° C. and absolute pressure of at least 50 bar; said secondary reforming is carried out substantially in absence of excess air relative to the stoichiometric amount, and said make-up synthesis gas has a $H_2$ to $N_2$ molar ratio in the range 2.5 to 3.

6. The process according to claim 5, wherein the reforming process is operated with a global steam-to-carbon ratio equal to or greater than 2.9.

7. The process according to claim 4, wherein the purification of said raw product gas comprises a step of high temperature shift (HTS) in at least one HTS converter and wherein steam produced by a step of thermal recovery from the primary reforming or from the at least one HTS converter is superheated, the heat source for steam superheating being a process gas feeding or leaving the at least one HTS converter.

8. The process according to claim 4, further comprising compression of an air feed directed to the secondary reforming within an air compressor, wherein said air feed is heated or cooled at the suction of the air compressor to maintain the inlet temperature of the air compressor within a target range.

9. The process according to claim 4, wherein said conversion of make-up synthesis gas into ammonia is carried out at a pressure which is 2.0 to 3.5 times the pressure of the primary reforming and said method comprises a step of compression of said make-up gas in a gas compressor, said gas compressor being driven by a condensing steam turbine with no steam extraction.

10. The process according to claim 4, wherein the reforming process further includes that a part of said hydrocarbon feedstock with steam is reformed in a step of gas-heated reforming in a gas-heated reformer, arranged either in series or in parallel with said air-fired secondary reforming.

* * * * *